(12) United States Patent
Tsuchida

(10) Patent No.: US 6,327,096 B1
(45) Date of Patent: Dec. 4, 2001

(54) SET OF LENS SYSTEM

(75) Inventor: Hirofumi Tsuchida, Hachioji (JP)

(73) Assignee: Olympus Optical Co., Ltd., Tokyo (JP)

( * ) Notice: Subject to any disclaimer, the term of this patent is extended or adjusted under 35 U.S.C. 154(b) by 0 days.

(21) Appl. No.: 09/069,104

(22) Filed: Apr. 29, 1998

(30) Foreign Application Priority Data

Apr. 30, 1997 (JP) .................................................. 9-124687

(51) Int. Cl.[7] ............................................... G02B 3/00
(52) U.S. Cl. ..................... 359/654; 359/435; 359/686; 359/652
(58) Field of Search .................... 359/435, 654, 359/652, 686, 689, 691

(56) References Cited

U.S. PATENT DOCUMENTS

| | | | | |
|---|---|---|---|---|
| 3,801,181 | * | 4/1974 | Kitano et al. | 350/96 |
| 3,823,995 | * | 7/1974 | Carpenter | 350/96 |
| 5,448,409 | * | 9/1995 | Noda | 359/654 |
| 5,805,345 | * | 9/1998 | Nagaoka | 359/654 |
| 5,841,586 | * | 11/1998 | Nagaoka | 359/654 |
| 5,999,327 | * | 12/1999 | Nagaoka | 359/654 |

* cited by examiner

*Primary Examiner*—Georgia Epps
*Assistant Examiner*—Tim Thompson
(74) *Attorney, Agent, or Firm*—Pillsbury Winthrop LLP

(57) ABSTRACT

A set of lens systems consisting of a plurality of different kinds of lens systems each comprising a radial type gradient index lens element(s), wherein the radial type gradient index lens elements have a common refractive index distribution.

17 Claims, 3 Drawing Sheets

SET OF LENS SYSTEM

BACKGROUND OF THE INVENTION a) Field of the Invention

The present invention relates to a set of lens systems which is to be used in various kinds of optical instruments such as cameras, video cameras, telescopes and microscopes.

b) Description of the Prior Art

Lens systems which are to be used in various kinds of optical instruments such as cameras, video cameras, telescopes, microscopes and endoscopes are ordinarily designed exclusively for the optical instruments in accordance with specifications of the instruments. Further, these lens systems generally have compositions consisting of large numbers of lens elements which are combined so as to improve optical performance of the instruments, and radii of curvature and glass materials have values which are designed exclusively for individual lens systems, whereby lens elements used for a lens system are rarely adopted for another lens system.

There are known examples wherein lens elements which compose optical systems are used commonly. One example is a camera or a microscope wherein a photographic lens system or an objective lens system is exchanged as a whole with another dependently on purposes of use. In this example, however, lens elements disposed in the lens systems are designed exclusively for the respective lens systems though the lens system as a whole is used commonly.

Another example which uses lens elements commonly is an attachment lens system for a front converter arranged before a lens system or a rear converter arranged after a lens system in a lens system of a camera or a video camrera and is used in a condition attached to different kinds of master lens systems. However, this attachment lens system is attached to the master lens systems mainly for changing axial focal lengths of the master lens systems but not for using lens elements themselves commonly.

Still another example which uses lens elements commonly is an optical experiment kit or the like which uses combinations of plural kinds of lens elements having different focal lengths which are prepared. However, these lens elements are combined simply to paraxially compose desired lens systems but not to obtain lens systems wherein aberrations are corrected sophisticatedly by combining the lens elements.

It has not been practiced to use lens elements themselves commonly to a plurality of lens elements in conventional optical systems as described above. The main reasons for the practical circumstances will be described below:

Aberrations of an ordinary lens element are remarkably varied by changing its radius of curvature, etc. since the lens element has extremely large freedom in its radius of curvature, thickness and glass material. In order to obtain desired optical performance by combining lens elements, it is therefore necessary to delicately define radii of curvature, thicknesses and glass materials of lens elements. In other words, a single lens element is extremely low in its versatility. Further, it is general that a single lens element has no sufficient capability to correct aberrations and can not be used independently in an optical instrument which requires optical performance of a high grade.

Conventional lens systems which do not allow lens elements to be used commonly to a plurality of lens systems constitute a high obstacle to reduce manufacturing costs of the lens systems.

SUMMARY OF THE INVENTION

A primary object of the present invention is to provide a set of a plurality of different kinds of lens systems each of which comprises a radial type gradient index lens element, wherein at least one radial type gradient index lens element in each lens system is a common lens element.

The set of lens systems according to the present invention is characterized in that it consists of different types (hereinafter referred to as different kinds) of lens systems, that each of the lens systems comprises a gradient index lens element and that at least one gradient index lens element disposed in each lens system has a refractive index distribution common to the lens systems.

Further, the set of lens systems according to the present invention is characterized in that the radial type gradient index lens elements which are comprised in the plurality of different kinds of lens systems and have the common refractive index distribution are different from one another in length in an axial direction.

Furthermore, the set of lens systems according to the present invention is characterized in that the radial type gradient index lens elements which are comprised in the different kinds of lens systems and have the common refractive index distribution satisfy the following conditions (1) and (2):

$$-0.2 < N_2 \cdot R_E^2 / N_1 < 0.2 \tag{1}$$

$$V_0 < V_1 \tag{2}$$

DETAILED DESCRIPTION OF THE PREFERRED EMBODIMENTS

Figure 1:
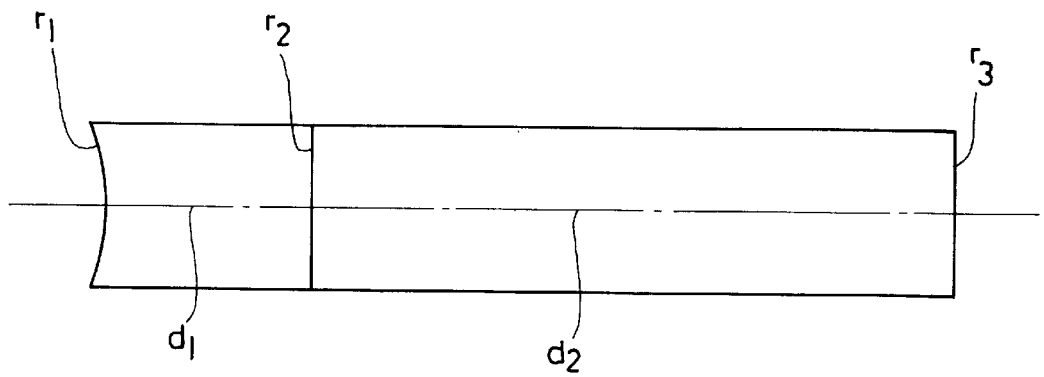
FIGS. 1 through 4 are sectional views illustrating a composition of a first embodiment of the present invention.

The set of lens systems according to the present invention is characterized in that it consists of a plurality of different lens systems each of which comprises a radial type gradient index lens element and that at least one radial type gradient index lens element comprised in each of the lens systems is a lens element which has a refractive index distribution common to the lens systems.

In order to make a lens element usable commonly to the lens systems in the set of the lens systems according to the present invention, this lens element is configured so as to have a high capability to correct aberrations by itself and a high versatility. A radial type gradient index lens element is known as a lens element which has a high capability to correct aberrations. A medium of this radial type gradient index lens element has a refractive index distribution $n(r)$ in a direction perpendicular to an optical axis which is expressed by the following formula (a):

$$n(r) = N_0 + N_1 r^2 + N_2 r^4 + N_3 r^6 + \ldots \tag{a}$$

wherein the reference symbol $N_0$ represents a refractive index on the optical axis, the reference symbol $N_i$ ($i=1$, 2, . . . ) designates a coefficient which expresses a refractive index distribution and the reference symbol r denotes a distance as measured from the optical axis in a direction perpendicular thereto.

Further, Abbe's numbers $V_0$ and $V_1$ of the radial type gradient index lens are given by the following formulae (b) and (c) respectively:

$$V_0 = (N_{0d} - 1)/(N_{0F} - N_{0C}) \quad (b)$$

$$V_i = N_{id}/(N_{iF} - N_{iC})(i=1, 2, 3, \ldots) \quad (c)$$

wherein the reference symbols $N_{id}$, $N_{iF}$ and $N_{iC}$ represent refractive index distribution coefficients of the 2i'th order for the d-line, F-line and C-line respectively.

Since the radial type gradient index lens element has a rather high aberration correcting capability even when it is used independently, it is possible by setting parameters at adequate values to configure the lens element so as to have rather high optical performance. Further, since the radial type gradient index lens element has an approximate power which is proportional to a product of the coefficient $N_1$ multiplied by its thickness, it is possible to change its power within a broad range by changing its thickness even when its refractive index distribution is kept unchanged. Accordingly, the radial type gradient index lens element makes it possible to use a radial type gradient index lens material which has a rather high versatility and a refractive index distribution that is common to a plurality of different lens systems.

When radial type gradient index lens elements which are made of a common material are to be used in the set of lens systems according to the present invention, or in a plurality of different lens systems, it is desirable for obtaining favorable optical performance and a high versatility of each of the lens element to configure the radial type gradient index lens element so as to satisfy the following conditions (1) and (2):

$$-0.2 < N_2 \cdot R_E^2/N_1 < 0.2 \quad (1)$$

$$V_0 < V_1 \quad (2)$$

wherein the reference symbol $R_E$ represents an effective radius of the radial type gradient index lens element.

In order to obtain favorable optical performance and a high versatility of a radial type gradient index lens element even when it is used independently, it is important to impart a power to the lens element while allowing it to produce aberrations in amounts as small as possible. The conditions (1) and (2) have been adopted for this purpose.

The condition (1) is required for maintaining favorable spherical aberration to be produced by a medium of the radial type gradient index lens element. If the lower limit of −0.2 of the condition (1) is exceeded, spherical aberration will be undercorrected remarkably. If the upper limit of 0.2 of the condition (1) is exceeded, in contrast, spherical aberration will undesirably be overcorrected remarkably.

The condition (2) is required for maintaining favorable chromatic aberration by reducing chromatic aberration to be produced by the medium of the radial type gradient index lens element. If the condition (2) is not satisfied, chromatic aberration will undesirably be remarkable.

When the radial type gradient index lens element which is to be used in a lens system which requires sophisticated correction of aberrations of the set of lens systems according to the present invention, it is desirable to satisfy not only the following condition (1-1) in place of the condition (1) but also the following condition (3). That is, it is desirable to satisfy both the following conditions (1-1) and (3):

$$-0.05 < N_2 \cdot R_E^2/N_1 < 0.05 \quad (1\text{-}1)$$

$$-0.01 < 1/V_1 < 0.02 \quad (3)$$

The condition (1-1) is required for correcting spherical aberration, like the condition (1), and maintaining spherical aberration more favorably. If the lower limit of −0.05 of the condition (1-1) is exceeded, spherical aberration will be remarkably undercorrected. If the upper limit of 0.05 of the condition (1-1) is exceeded, spherical aberration will be remarkably overcorrected.

The condition (3) is required for further reducing an amount of chromatic aberration to be produced by the medium of the radial type gradient index lens element. If the upper limit of 0.02 of the condition (3) is exceeded, chromatic aberration will be remarkable. If the lower limit of −0.01 of the condition (3) is exceeded, in contrast, chromatic aberration will be produced in the opposite direction.

Further, it is desirable that a maximum difference $\Delta n$ between refractive indices of the radial type gradient index lens element satisfies the following condition (4):

$$\Delta n < 0.2 \quad (4)$$

If the condition (4) is not satisfied, it will be difficult to manufacture a material.

By varying thickness of radial type gradient index lens elements, it is possible to impart different powers to the radial type gradient index lens elements as described above even when they have the same refractive index distribution.

Optical performance of the radial type gradient index lens element can be enhanced and its power is selectable within a broad range, as described above. Therefore, the radial type gradient index lens element has a high versatility, and is usable as a portion of a lens system or independently, thereby usable as a common lens element which is common to a plurality of different lens systems. Accordingly, the radial type gradient index lens element makes it possible to reduce kinds of lens elements and carry out a mass production of the common lens element at a manufacturing stage of lens elements, thereby reducing a manufacturing cost of a set of lens systems which are of different kinds in particular.

The radial type gradient index lens element which is to be used as a lens element common to the lens systems of different kinds of the set of lens systems according to the present invention is usable as a lens group in combination with another lens element or as a lens component, and the lens group or the lens component is usable as a common portion of different kinds of lens systems. Further, when the lens group or the lens component which comprises the lens element is configured so as to have favorable optical performance by itself, the lens group or the lens component is usable commonly in a plurality of different lens systems. Further, it is possible to favorably correct aberrations in a lens element itself by configuring it as a radial type gradient index lens element which satisfies the conditions described above and use the lens element commonly in a plurality of different kinds of lens systems.

Now, the preferred embodiments of the present invention will be described with reference to the accompanying drawings.

Description will be made of a first embodiment of the present invention on the basis of four examples of A through D which have compositions illustrated in FIGS. 1 through 4.

FIG. 1 shows an example of a lens system preferred as an embodiment 1-A having numerical data which is listed below:

Embodiment 1-A

```
f = 3.83, F/2.0, 2ω = 52.3°,
maximum image height 1.6, f_B = 0
r_1 = -5.900
d_1 = 5.5000        n_1 = 1.52542        ν_1 = 55.8
r_2 = ∞ (stop)
d_2 = 17.1781       n_2 (gradient index lens element)
r_3 = ∞
``` refractive index distribution coefficients $N_0=1.66400$, $N_1=-1.0380\times10^{-2}$, $N_2=1.0000\times10^{-5}$ $V_0=38.2$, $V_1=300$, $V_2=300$ $R_E=1.7$, $N_2 \cdot R_E^2/N_1=0.003$ The lens system preferred as the embodiment 1-A is composed of two lens elements cemented to each other: in order from the object side, a homogeneous concave lens element and a radial type gradient index lens element having planar surfaces on both sides. The radial type gradient index lens element which is disposed on the image side in this lens system is a lens element which is used commonly.

This lens system is to be used mainly as an image pickup lens system for video cameras and configured to form an image on an image side surface of the radial type gradient index lens element.

Figure 2:
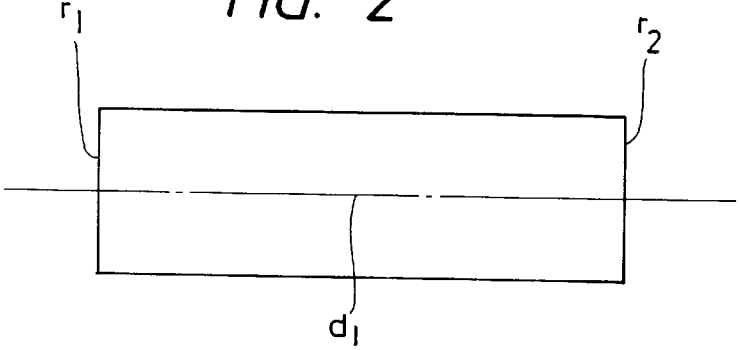

Further, a lens system preferred as an embodiment 1-B has a composition illustrated in FIG. 2 and numerical data which is listed below:

Embodiment 1-B

```
f = 5.38, F/2.0, 2ω = 34.5°,
maximum image height 1.6, f_B = 0
r_1 = ∞ (stop)
d_1 = 14.0632       n_1 (gradient index lens element)
r_2 = ∞
``` refractive index distribution coefficients $N_0=1.66400$, $N_1=-1.0380\times10^{-2}$, $N_2=1.0000\times10^{-5}$ $V_0=38.2$, $V_1=300$, $V_2=300$ $R_E=1.7$, $N_2 \cdot R_E^2/N_1=0.003$ The embodiment 1-B is composed of a single radial type gradient index lens element which has planar surfaces on both sides. This lens system is to be used mainly as an image pickup lens system for video cameras and is configured so as to form an image on an image side surface of the radial type gradient index lens element.

Figure 3:
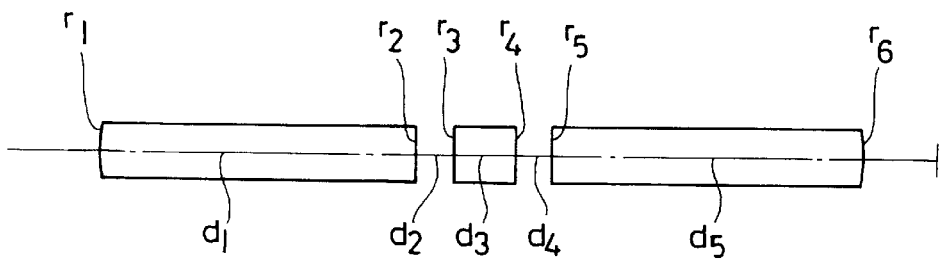

A lens system preferred as an embodiment 1-C has a composition illustrated in FIG. 3 and numerical data which is listed below:

Embodiment 1-C

```
NA 0.085, maximum image height 0.98, object point 5.0,
IO = 60.5, imaging at a magnification of 1x, f_B = 5
r_1 = 10,000
d_1 = 21.000        n_1 = 1.62004        ν_1 = 36.3
r_2 = ∞
d_2 = 2.4092
r_3 = ∞
d_3 = 4.1816        n_2 (gradient index lens element)
r_4 = ∞
d_4 = 2.4092
r_5 = ∞
d_5 = 21.000        n_3 = 1.62004        ν_3 = 36.3
r_6 = -10.000
``` refractive index distribution coefficients $N_0=1.66400$, $N_1=-1.0380\times10^{-2}$, $N_2=1.0000\times10^{-5}$ $V_0=38.2$, $V_1=300$, $V_2=300$ $R_E=1.325$, $N_2 \cdot R_E^2/N_1=0.002$ The embodiment 1-C is composed of three lens elements: in order from the object side, a homogeneous convexo-planar lens element, a radial type gradient index lens element having planar surfaces on both sides and a. homogeneous plano-convex lens element. The second radial type gradient index lens element disposed in this lens system is used commonly.

The lens system preferred as the embodiment 1-C is to be used as a relay lens system for non-flexible endoscopes.

Figure 4:
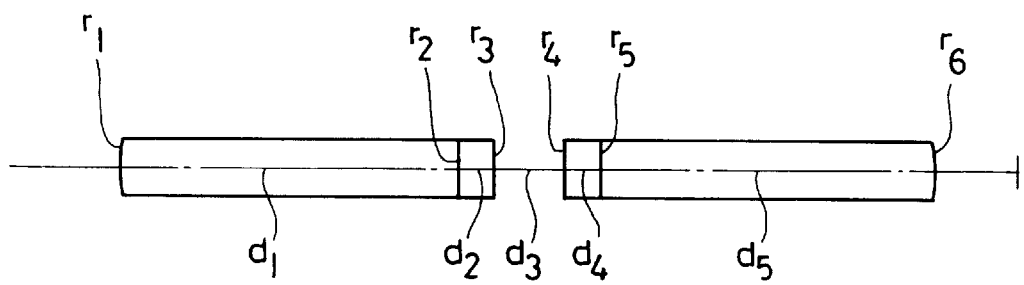

A lens system preferred as an embodiment 1-D has a composition illustrated in FIG. 4 and numerical data which is listed below:

Embodiment 1-D

```
NA 0.085, maximum image height 0.98, object point 5.0,
IO = 60.5, imaging at a magnification of 1x, f_B = 5
r_1 = 10.000
d_1 = 21.000        n_1 = 1.62004        ν_1 = 36.3
r_2 = ∞
d_2 = 2.3295        n_2 (gradient index lens element 1)
r_3 = ∞
d_3 = 4.3410
r_4 = ∞
d_4 = 2.3295        n_3 (gradient index lens element 2)
r_5 = ∞
d_5 = 21.000        n_4 = 1.62004        ν_4 = 36.3
r_6 = -10.000
``` refractive index distribution coefficients (gradient index lens element 1)

$N_0=1.66400$, $N_1=-1.038\times10^{-2}$, $N_2=1.0000\times10^{-5}$ $V_0=38.2$, $V_1=300$, $V_2=300$ refractive index distribution coefficients (gradient index lens element 2)

$N_0=1.66400$, $N_1=-1.0380\times10^{-2}$, $N_2=1.0000\times10^{-5}$ $V_0=38.2$, $V_1=300$, $V_2=300$ $R_E=1.325$, $N_2 \cdot R_E^2/N_1=0.002$ This lens system is composed of four lens elements: in order from the object side, a homogeneous convexo-planar lens element, a radial type gradient index lens element having planar surfaces on both sides, a radial type gradient index lens element having planar surface on both sides and a homogeneous plano-convex lens element. Like the embodiment 1-C, the embodiment 1-D is used as a relay lens system for non-flexible endoscopes.

The lens system preferred as the embodiments 1-A, 1-B, 1-C and 1-D described above comprise radial type gradient index lens elements which have the same refractive index distribution. Speaking concretely, the lens element disposed on the image side in the embodiment 1-A, the lens element disposed in the embodiment 1-B, and second lens element of the embodiment 1-C, and the second and third lens elements of the embodiment 1-D are used commonly. These lens elements are made of a radial type gradient index glass material which has the same refractive index distribution, but different only in lengths (thickness) and effective diameters thereof.

As in the first embodiment, it is possible to use a radial type gradient index material commonly in a plurality of different lens systems while varying only lengths (thicknesses of lens elements) and effective diameters. In other words, the four different kinds of lens systems preferred as the embodiment 1-A, the embodiment 1-B, the embodiment 1-C and the embodiment 1-D use the common radial type gradient index lens elements.

Further, each of the gradient index lens elements used in the embodiments 1-A, 1-B, 1-C and 1-D has planar surfaces on both sides and can easily be worked.

The set of lens systems according to the present invention in which the lens elements are commonly used as in the first embodiment can be manufactured at a remarkably lowered cost as the set of the plurality of lens systems as a whole.

The radial type gradient index lens material used in the embodiments 1-A, 1-B, 1-C and 1-D has a refractive index distribution which is imparted by distributing concentrations mainly of barium. By distributing barium at a high concentration in a central portion of a lens element and distributing titanium or lead at high concentrations in marginal portions thereof, it is possible to obtain a radial type gradient index lens element whose medium produces chromatic aberration in a small amount.

Further, the embodiments 1-A and 1-B are lens systems for video cameras and use solid-state image pickup devices such as CCDs as image pickup devices. Therefore, these lens systems ordinarily use filters to cut off infrared rays. Though the infrared cut filters may be disposed on the object side of the lens systems, it is possible to configure the radial type gradient index lens element so as to have functions of the infrared cut filters in their interiors.

In order to obtain a function of an infrared cut filter in an interior of a radial type gradient index lens element, it is sufficient to prepare a material so as to contain copper ions or a similar component which absorbs infrared rays. Though a certain lens system may require two kinds of materials, one of which has the function to cut off the infrared rays, and the other of which has no such a functions, when radial type gradient index lens elements which contain a component absorbing the infrared rays are to be used commonly, the material which has the function to absorb the infrared rays is only a modification of the material which has the function to cut off the infrared rays and steps other than that to contain ions having the function described above (for example, copper ions) can be carried out commonly, thereby posing no problem from a viewpoint of a manufacturing cost.

Figure 5:
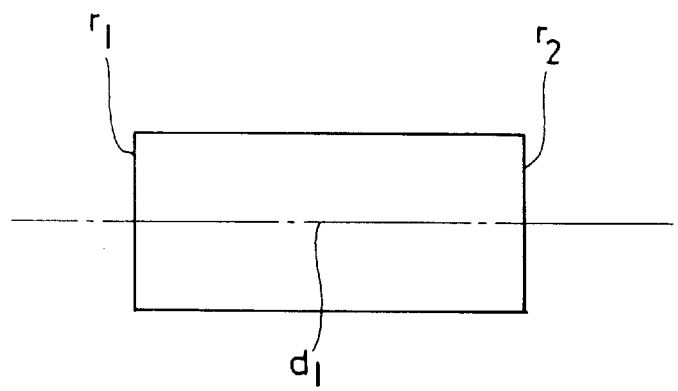
FIGS. 5 through 7 are sectional views illustrating a composition of a second embodiment of the present invention.
Figure 6:
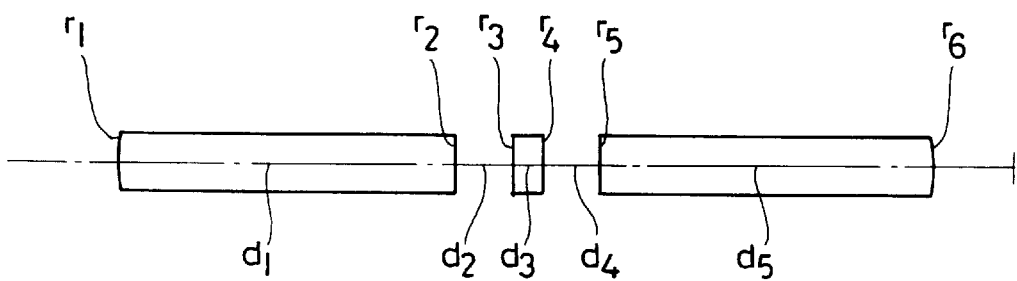
Figure 7:
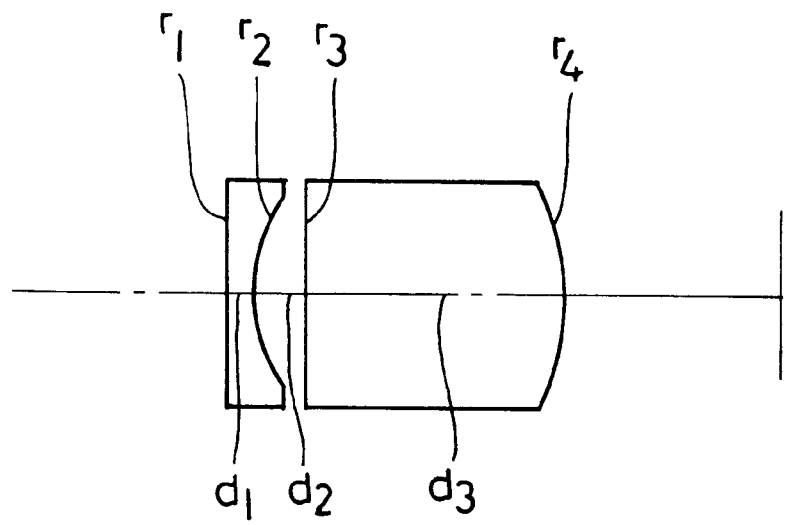

A second embodiment of the set of lens systems according to the present invention consists of three different kinds of lens systems which have compositions illustrated in FIGS. 5 through 7.

A first example (embodiment 2-A) of the second embodiment is a lens element which has a composition shown in FIG. 5 and numerical data which is listed below:
Embodiment 2-A f = 3.66, F/2.0, 2ω = 49.2°,
maximum image height 1.6, $f_B = 0$
$r_1 = \infty$ (stop)
$d_1 = 9.7638$   $n_1$ (gradient index lens element)
$r_2 = \infty$ refractive index distribution coefficients
$N_0=1.70000$, $N_1=-2.2000\times10^{-2}$, $N_2=0$
$V_0=50.0$, $V_1=600$, $V_2=600$
$R_E=1.7$, $N_2 \cdot R_E^2/N_1=0$ The embodiment 2-A is a lens system consisting of a single radial type gradient index lens element which has a common refractive index distribution and planar surfaces on both sides. This lens system is used as an image pickup lens system for video cameras and configured to form an image on an image side surface of the radial type gradient index lens element.

An embodiment 2-B is a lens system which has a composition illustrated in FIG. 6, or is composed of three lens elements: in order from the object side, a homogeneous convexo-planar lens element, a radial type gradient index lens element having two planar end surfaces and a homogeneous plano-convex lens element. This lens system has numerical data which is listed below:
Embodiment 2-B NA 0.081, maximum image height 0.98, object point 5.0,
IO = 60.5, imaging at a magnification of 1x, $f_B = 5$
$r_1 = 10.000$
$d_1 = 21.000$        $n_1 = 1.62004$        $v_1 = 36.3$
$r_2 = \infty$
$d_2 = 3.5509$
$r_3 = \infty$ (stop)
$d_3 = 1.8982$        $n_2$ (gradient index lens element)
$r_4 = \infty$
$d_4 = 3.5509$
$r_5 = \infty$
$d_5 = 21.000$        $n_3 = 1.62004$        $v_3 = 36.3$
$r_6 = -10.000$ refractive index distribution coefficients
$N_0=1.70000$, $N_1=-2.200\times10^{-2}$, $N_2=0$
$V_0=50.0$, $V_1=600$, $V_2=600$
$R_E=1.325$, $N_2 \cdot R_E^2/N_1=0$ The lens system preferred as the embodiment 2-13 is used as a relay lens system for non-flexible endoscopes and the second radial type gradient index lens element has a refractive index distribution which is the same as that of the radial type gradient index lens element preferred as the embodiment 2-A.

An embodiment 2-C is a lens system which has a composition illustrated in FIG. 7, or is composed of two lens elements: in order from the object side, a homogeneous plano-concave lens element and a plano-convex radial type gradient index lens element. This lens system has numerical data which is listed below:
Embodiment 2-C f = 3.5, F/2.8, 2ω = 54.0°,
maximum image height 1.6, $f_B = 4.312$
$r_1 = \infty$
$d_1 = 0.5000$        $n_1 = 1.51633$        $v_1 = 64.1$
$r_2 = 1.7400$
$d_2 = 1.0000$
$r_3 = \infty$ (stop)
$d_3 = 2.5000$        $n_2$ (gradient index lens element)
$r_4 = -4.9800$ refractive index distribution coefficients
$N_0=1.70000$, $N_1=-2.200\times10^{-2}$, $N_2=0$
$V_0=50.0$, $V_1=600$, $V_2=600$
$R_E=1.7$ $N_2 \cdot R_E^2/N_1=0$ The lens system preferred as the embodiment 2-C is used mainly as an image pickup lens system for video cameras and the plano-convex radial type gradient index lens element used as the second lens element has a refractive index distribution which is the same as that of the gradient index lens element used in the embodiment 2-A.

The radial type gradient index lens elements which are used in the three different embodiments 2-A, 2-B and 2-C have the same refractive index distribution as described above and a radial type gradient index lens material can be used commonly in a plurality of different lens systems simply while varying only lengths and effective diameters of the lens elements.

Out of the lens elements used in these three embodiments, each of the radial type gradient index lens elements used in the embodiments 2-A and 2-B has planar end surfaces, whereas the radial type gradient index lens element used in the embodiment 2-C has a plano-convex shape.

By using common lens elements in a plurality of different lens systems as described above, it is possible to remarkably lower a manufacturing cost of a set of the lens systems preferred as the embodiment as a whole.

A radial type gradient index lens material used in these embodiments 2-A, 2-B and 2-C has a refractive index which is varied by distributing concentrations mainly of lanthanum. Speaking more concretely, the lens elements which produce chromatic aberration in small amounts by a medium thereof (the radial type gradient index lens elements) are obtained by distributing lanthanum in a glass material so that concentrations of lanthanum are high at central portions of the lens elements and concentrations of titanium or lead are high at marginal portions of the lens elements. A similar effect can be obtained by using yttrium in place of the lanthanum.

Gradient index lens elements which have refractive index distributions imparted by distributing lanthanum or yttrium as in these embodiments have a merit that they can have refractive index differences larger than those of gradient index lens elements which have refractive index distributions imparted by distributing barium as described with reference to the embodiments 1-A, 1-B, 1-C and 1-D.

Now, description will be made of a production system of the gradient index lens elements used in each lens system of the set of lens systems according to the present invention.

Figure 8:
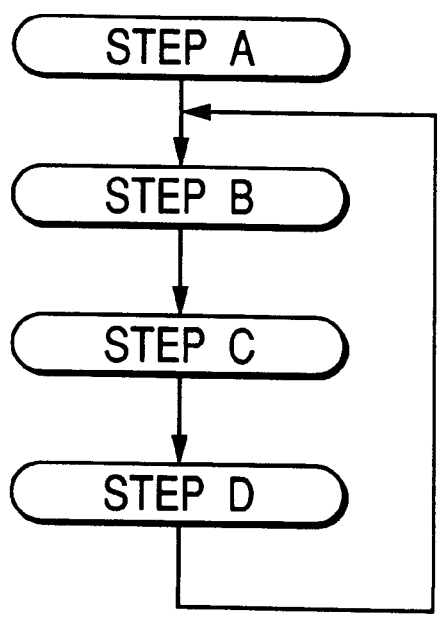
FIG. 8 is a diagram exemplifying a production system for a gradient index lens element to be used in the set of lens systems according to the present invention.

A system which is shown in FIG. 8 is conceivable as an example of a production system for the gradient index lens elements used in the set of lens systems according to the present invention. At a step A, a material for radial type gradient index lens elements is manufactured in a large amount and in a form of a rod which is sufficiently long as compared with its diameter. At a step B, the material is cut into a piece which is matched with a lens system in which it is to be used but a little thicker than a desired thickness. At a step C, surfaces of the piece are worked to the desired thickness. This working may be carried out so as to obtain polished surfaces or sand-blasted surfaces. When the working is carried out to obtain the sand-blasted surface, however, the piece has no lens function and it is necessary to work it so as to fill coarse surfaces such as surfaces to be cemented at a stage to assemble in a lens system. At a final step D, an outer circumference of the piece is worked so as to obtain a desired size of a lens contour (desired diameter). A gradient index lens element which is to be used in a lens system is manufactured as described above. When the lens element is to be used in another lens system, it is sufficient to work the lens element in the procedures described above in accordance with a thickness and a size of the lens system.

It is possible to use a kind of radial type gradient index lens material in a plurality of lens system by working its thickness, radii of curvature on surfaces and a contour as described above. By adopting a production system such as that described above, it is possible to reduce kinds of radial type gradient index lens materials manufactured, thereby lowering manufacturing costs of lens systems.

Further, manufacturing costs can be further lowered by cutting out lenses so as to produce remainders as small as possible and determining a combination of a plurality of different systems which are to use the lenses at a stage to cut out lenses from a rod-shaped gradient index lens material. Further, the lenses are allocated to the individual lens systems dependently on cut results of the lenses. Lenses which have excellent cut results, for example, are allocated to lens systems which require strict allowances. Out of lens pieces which are cut from the rod-shaped material, at least one is used in a lens system which comprises a lens element having planar surfaces on both sides. By cutting out and using the lenses as described above, it is possible to measure a refractive index distribution without preparing a sample which has two planar surfaces on both side in particular.

Now, description will be made of a design technique for the set of lens systems according to the present invention.

A lens material which is to be used for the set of lens systems according to the present invention (the radial type gradient index lens element described above) has rather favorable optical performance even when it is used independently. Refractive index distribution coefficients of this lens material are selected so as to correct aberrations in a certain lens system of the set of a plurality of different kinds lens systems, thereby determining refractive index distribution coefficients of a radial type gradient index lens material which is to be used commonly.

With the refractive index distribution coefficients of the radial type gradient index lens element fixed the values determined in the design procedures described above, another lens system is designed through optimalization using its thickness, radii of curvature on surfaces and effective diameter as variables.

Still another lens system can be designed in the similar procedures.

It is possible in the procedures described above to design two or more different lens systems which comprise radial type gradient index lens elements having a common refractive index distribution.

Description has been made above of a case wherein one kind of radial type gradient index lens elements which have a common refractive index distribution are used in a plurality of lens systems which are of different kinds. When this concept of the present invention is developed to use a plural kinds of radial type gradient index lens elements which have different refractive index distributions, it is possible, by using plural kinds of radial type gradient index lens elements which have different refractive index distributions, to compose more kinds of lens systems with a common material. In other words, it is possible to compose K+n (n=1, 2, . . . ) kinds of lens systems by using K kinds of radial type gradient index lens elements. For example, it is possible to compose four or more different kinds of lens systems by using three kinds (K=3) of radial type gradient index lens elements.

What is claimed is:

1. A set of lens systems comprising a plurality of different kinds of lens systems each comprising a radial type gradient index lens element, wherein said radial type gradient index lens elements have a common refractive index distribution, wherein at least one lens system of said plurality of different kinds of lens systems consists of a radial type gradient index lens element which has said common refractive index distribution, and wherein said radial type gradient index lens elements having a common refractive index distribution have lengths which are different from each other in axial directions.

2. A set of lens systems comprising a plurality of different kinds of lens systems each comprising a radial type gradient index lens element, wherein said radial type gradient index lens elements have a common refractive index distribution, wherein at least one lens system of said plurality of different kinds of lens systems consists of a radial type gradient index lens element which has said common refractive index distribution, wherein said plurality of different kinds of lens systems includes at least one of a relay lens system for a non-flexible endoscope and an image pickup lens system for a video camera, and wherein said radial type gradient index lens element which has the common refractive index distribution satisfies the following condition (1):

$$-0.2 < N_2 R_E^2 / N_1 < 0.2 \tag{1}$$

wherein the reference symbols $N_1$ and $N_2$ represent distribution coefficients of the second order and the fourth order respectively in a formula expressing a refractive index distribution n(r) which is shown below, and the reference symbol $R_E$ designates an effective radius of the radial type gradient index tens element, $$N(r) = N_0 + N_1 r^2 + N_2 r^4 + N_3 r^6 + \ldots$$

wherein the reference symbol $N_0$ represents a refractive index on an optical axis, the reference symbols $N_1$, $N_2$, ... designate refractive index distribution coefficients of the second, fourth, ... orders respectively, and the reference symbol r denotes a distance as measured from the optical axis.

3. A set of lens systems according to claim 1, wherein said radial type gradient index lens element which has the common refractive index distribution satisfies the following condition (2):

$$V_0 < V_1 \tag{2}$$

wherein the reference symbols $V_0$ and $V_1$ represent Abbe's numbers of the radial type gradient index lens element which are given by the following formulae:

$$V_0 = (N_{0d} - 1)/(N_{0F} - N_{0C})$$
$$V_1 = N_{1d}/(N_{1F} - N_{1C})$$

wherein the reference symbols $N_{0d}$, $N_{0F}$ and $N_{0C}$ represent the refractive indices $N_0$ on the optical axis for the d-line, F-line and c-line respectively, and the reference symbols $N_{1d}$, $N_{1F}$ and $N_{1C}$ designate refractive index distribution coefficients $N_1$ for the d-line F-line and C-line respectively in the formula expressing the refractive index distribution n(r) which is shown below:

$$n(r) = N_0 + N_1 r^2 + N_2 r^4 + \ldots$$

wherein the reference symbol $N_0$ represents a refractive index on an optical axis, the reference symbols $N_1$, $N_2$, coefficients of the second, fourth, ... orders respectively, and the reference symbol r denotes distance as measured from the optical axis.

4. A set of lens systems according to claim 1, wherein a maximum refractive index difference Δn of said radial type gradient index lens element which has the common refractive index distribution satisfies the following condition (4):

$$\Delta n < 0.2. \tag{4}$$

5. A set of lens systems according to claim 1, wherein a refractive index gradient of said radial type gradient index lens element which has the common refractive index distribution is imparted by a concentration distribution mainly of barium.

6. A set of lens systems according to claim 1, wherein a refractive index gradient of said radial type gradient index lens element which has the common refractive index distribution is imparted by a concentration distribution mainly of lanthanum.

7. A set of lens systems according to claim 1, wherein said radial type gradient index lens element which has the common refractive index distribution has planar surfaces on both sides thereof.

8. An optical instrument which uses any one of the lens systems of the set of lens systems as claimed in claim 1.

9. A set of lens systems comprising a plurality of different kinds of lens systems each comprising a radial type gradient index lens element, wherein said radial type gradient index lens elements have a common refractive index distribution, wherein at least one of the lens systems of said plurality of different kinds of lens systems consists of a negative lens element disposed on an object side and a positive lens element disposed on an image side of said negative lens element, and wherein said radial type gradient index lens elements having a common refractive index distribution have lengths which are different from each other in axial directions.

10. A set of lens systems comprising a plurality of different kinds of lens systems each comprising a radial type gradient index lens element, wherein said radial type gradient index lens elements have a common refractive index distribution, wherein at least one of the lens systems of said plurality of different kinds of lens systems consists of a negative lens element disposed on an object side and a positive lens element disposed on an image side of said negative lens element, wherein said plurality of different kinds of lens systems includes at least one of a relay lens system for a non-flexible endoscope and an image pickup lens system for a video camera, and wherein said radial type gradient index lens element which has the common refractive index distribution satisfies the following condition (1):

$$-0.2 < N_2 R_E^2 / N_1 < 0.2 \tag{1}$$

wherein the reference symbols $N_1$ and $N_2$ represent distribution coefficients of the second order and the fourth order respectively in a formula expressing a refractive index distribution n(r) which is shown below, and the reference symbol $R_E$ designates an effective radius of the radial type gradient index lens element, $$N(r) = N_0 + N_1 r^2 + N_2 r^4 + N_3 r^6 + \ldots$$

wherein the reference symbol $N_0$ represents a refractive index on an optical axis, the reference symbols $N_1$, $N_2$, ... designate refractive index distribution coefficients of the second fourth, ... orders respectively, and the reference symbol r denotes a distance as measured from the optical axis.

11. A set of lens systems according to claim 9, wherein said positive lens element consists of a radial type gradient index lens element which has a common refractive index distribution.

12. A set of lens systems according to claim 9, wherein said radial type gradient index lens element which has the common refractive index distribution satisfies the following condition (2):

$$V_0 < V_1 \tag{2}$$

wherein the reference symbols $V_0$ and $V_1$ represent Abbe's numbers of the radial type gradient index lens element which are given by the following formulae:

$$V_0 = (N_{0d} - 1)/(N_{0F} - N_{0C})$$

$$V_1 = N_{1d}/(N_{1F} - N_{1C})$$

wherein the reference symbols $N_{0d}$, $N_{0F}$ and $N_{0C}$ represent the refractive indices $N_0$ on the optical axis for the d-line, F-line and C-line respectively, and the reference symbols $N_{1d}$, $N_{1F}$ and $N_{1C}$ designate refractive index distribution coefficients $N_1$ for the d-line, F-line and C-line respectively in the formula expressing the refractive index distribution n(r) which is shown below:

$$n(r) = N_0 + N_1 r^2 + N_2 r^4 + \ldots$$

wherein the reference symbol $N_0$ represents a refractive index on an optical axis, the reference symbols $N_1$, $N_2$, ... designate refractive index distribution coefficients of the second, fourth, ... orders respectively, and the reference symbol r denotes a distance as measured from the optical axis.

13. A set of lens systems according to claim 9, wherein a maximum refractive index difference Δn of said radial type gradient index lens element which has the common refractive index distribution satisfies the following condition (4):

$$\Delta n < 0.2. \tag{4}$$

14. A set of lens systems according to claim 9, wherein a refractive index gradient of said radial type gradient index lens element which has the common refractive index distribution is imparted by a concentration distribution mainly of barium.

15. A set of lens systems according to claim 9, wherein a refractive index gradient of said radial type gradient index lens element which has the common refractive index distribution is imparted by a concentration distribution mainly of lanthanum.

16. A set of lens systems according to claim 9, wherein said radial type gradient index lens element of said at least one lens system which has the common refractive index distribution has planar surfaces on both sides thereof.

17. An optical instrument comprising any one of the lens systems of the set of lens systems as claimed in claim 9.

* * * * *